Patented June 5, 1934

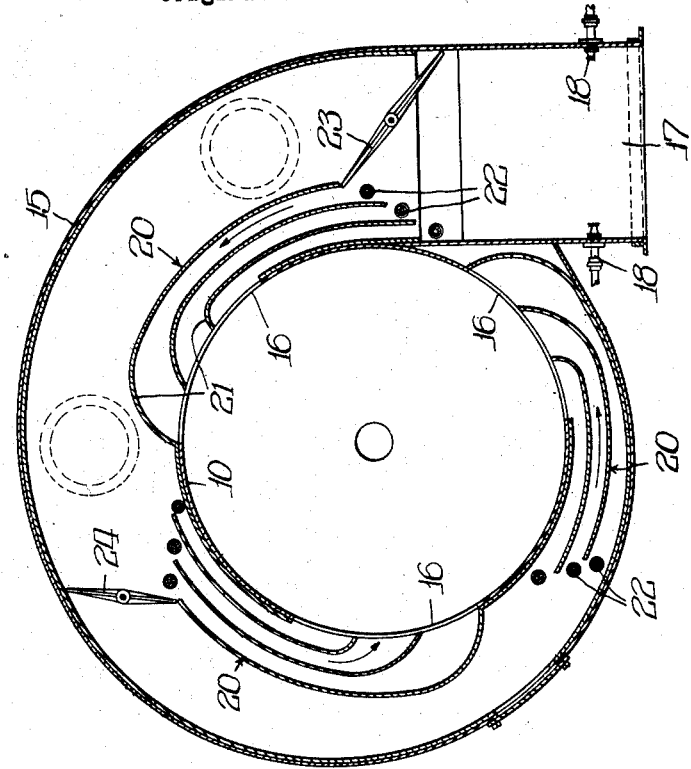
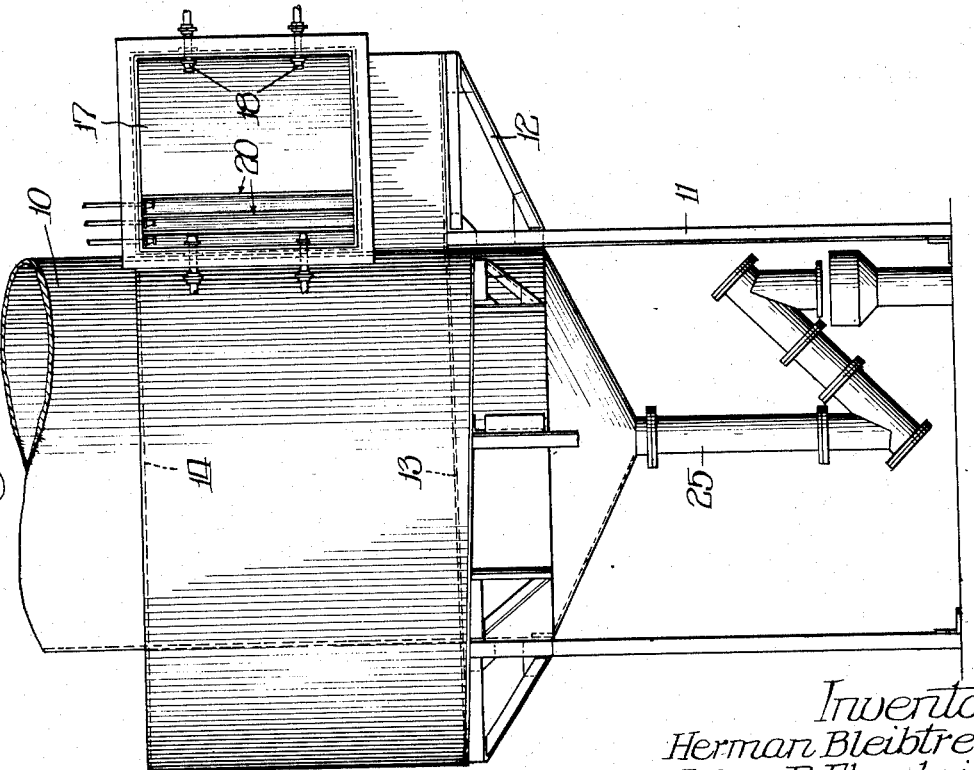

1,961,956

UNITED STATES PATENT OFFICE 1,961,956

FLUE GAS CLEANING APPARATUS

Herman Bleibtreu, Darmstadt, Germany, and John B. Eberlein, Chicago, Ill., assignors to Freyn Engineering Company, Chicago, Ill., a corporation of Maine Original application December 18, 1931, Serial No. 581,850. Divided and this application June 29, 1933, Serial No. 678,106

6 Claims. (Cl. 183—21)

The invention relates to gas washing apparatus and has reference particularly to an improved washer for flue gases.

An object of the invention is to provide a washer for gases carrying suspended matter in the form of dust such as flue gases which will divide the main gas stream into a plurality of smaller streams to increase the surface available for contact with the gas and to step up the velocity of the gases passing through the washer to increase the effect of centrifugal force on the solid particles carried along in the individual streams.

A further object is to provide a gas washer in which the gases may be proportionately discharged through a plurality of openings spaced in the direction of the gas flow or may be directed for total discharge through the first of said openings or through the first and second opening, depending on the volume and velocity of the gases being delivered to the washer.

A further object is to provide a gas washer using water as the washing medium and which can be operated with maximum efficiency on varying volumes of gas of either high or low pressures.

With these and various other objects in view, the invention may consist of certain novel features of construction and operation as will be more fully described and particularly pointed out in the specification, drawing and claims appended hereto.

In the drawing which illustrates an embodiment of the device and wherein like reference characters are used to designate like parts—

Figure 1 is an elevational view of a washer embodying the improvements of the invention and shown in associated relation with a flue stack, and Figure 2 is a horizontal sectional view taken substantially through the center of the washer shown in Figure 1.

This application is a divisional of our prior Patent No. 1,933,699 dated November 7, 1933.

Referring to Figures 1 and 2 of the drawing there is shown one form of washer associated with a vertical flue stack 10, the same being suitably supported by means of the vertical supports 11 and diagonal braces 12. The washer consists of a spiral housing 15, Figure 2. The inner circular wall of the housing is provided by the vertical stack 10 associated therewith and for permitting communication between the interior of the housing and the stack the latter is provided with outlets 16.

The flue gases are admitted to the housing through an opening or inlet 17, the housing being provided adjacent the inlet with a plurality of nozzles 18 suitably connected to a source of water supply so that the nozzles form a spray giving the gases a preliminary washing as they enter the housing. Located in the housing and extending from the top to the bottom walls are a plurality of partitions 20. A number of the partitions are associated with each of the outlets 16 and are so positioned as to extend from a point within the housing to the outlets where the ends of the partition are given an abrupt curvature as at 21, the same, however, being for a portion of their length substantially parallel with each other and with the wall 10 forming the inner wall of the housing. Partitions form a number of separate passageways functioning to divert the gases passing through the housing toward their associated outlets 16. In advance of each passage is located a water nozzle 22 extending through the top wall and being directed downwardly so that the gases entering the passages are again subjected to the action of a water spray.

Located adjacent the passages formed by the partitions nearest the inlet 17 is a damper 23 which when closed as in Figure 2 will serve to divert all the gases admitted to the housing toward the first set of partitions. Adjacent the second set of partitions is a second damper 24 which functions in the same manner as described. When the washer is receiving its maximum volume of gases it will be seen that the dampers will be located in open position, allowing the gases to flow through the housing, a portion being diverted by the first set of partitions, another portion being diverted by a second set of partitions, and finally, the remaining being conducted to outlet 16 by the last set of partitions. When the apparatus is operating on a substantially reduced volume of gases it is desirable to close damper 24 leaving damper 23 in open position, or in some instances to also close damper 23. Diverting all of the gases admitted to the housing toward a single set of partitions functions to materially increase the velocity of the gases as they travel through the individual passages, thus substantially increasing the centrifugal force exerted on the solid particles in the gas streams and also increasing the baffling effect given to the gases.

It will be seen that the particular curvature given to the partitions 20 will give a whirling motion to the gases passing therethrough and in changing their direction of flow the same are caused to contact the outer wall of each passage. The formation of the partitions is such as to change the direction of flow of the streams and also to impart a baffling effect to the gases, the latter being accomplished by the abrupt curvature given to the terminal portions of the partitions. The surfaces are maintained in a wet condition by reason of the gas first having passed through the water sprays and the solid particles are caused to adhere to the surfaces by the moisture and to thus separate from the streams. As the gases strike the terminal ends 21 their velocity is greatly decreased, the effect causing the solid particles to drop by gravity so that the gases when delivered to the outlets 16 have by the combined action of the water spray and the partitions been thoroughly cleaned. The effect of the partitions is to cause the solid particles in the gases to be more intimately brought into contact with the wetted surfaces, with the effect that the particles eventually unite with the water forming a slurry which is conducted by the drain 25 to suitable settling tanks or the like.

It is to be understood that we do not wish to be limited by the exact embodiment of the device shown, which is merely by way of illustration and not limitation as various and other forms of the device will of course be apparent to those skilled in the art without departing from the spirit of the invention or the scope of the claims.

We claim:

1. In a gas washer, a spiral housing including an inner and outer wall and having an inlet at its open end and a plurality of outlets, said outlets being spaced around its inner wall and discharging into a common outlet, a plurality of arcuate partitions associated with each individual outlet and being positioned within the housing, and spray nozzles located in advance of the passages formed by the partitions.

2. In a gas washer, a spiral housing including an inner and outer wall and having an inlet at its open end and a plurality of outlets, said outlets being spaced around its inner wall and discharging into a common outlet, a plurality of arcuate partitions located in the housing and associated with each individual outlet, the partitions nearest the inlet diverting a portion of the main gas stream, and the partitions farthest from the inlet diverting the remainder of the stream and discharging into said common outlet.

3. In a gas washer, in combination, a spiral housing including an inner and outer walls, an inlet at one end, and a plurality of outlets spaced around the inner wall of the housing, a plurality of partitions extending from each outlet and being parallel to the inner wall, said partitions forming passages opening in a direction to receive the gases flowing through the housing, spray nozzles positioned adjacent the inlets of the passages, and dampers mounted in the housing adjacent the inlets of certain passages.

4. In a gas washer, a housing providing a passage of gradually decreasing cross-sectional area in the direction of gas flow, a plurality of spaced openings in one wall of the housing leading to a common outlet, and partitions of curvilinear contour associated with each opening for directing a portion of the gases flowing through the housing toward the opening.

5. In a gas washer, a housing including a substantially circular inner wall, and a connecting outer wall of spiral shape to provide a passage of gradually decreasing cross-sectional area in the direction of gas flow, a plurality of openings in the circular wall leading to a common outlet, and partitions of curvilinear contour associated with each opening for directing a portion of the gases flowing through the housing toward the opening.

6. In a gas washer, a housing including a substantially circular inner wall, and a connecting outer wall of spiral shape to provide a passage of gradually decreasing cross-sectional area in the direction of gas flow, a plurality of openings in the circular wall leading to a common outlet, partitions of curvilinear contour associated with each opening for directing a portion of the gases flowing through the housing toward the opening, and a damper in the housing for restricting the flow of gas therethrough and for directing the flow toward certain partitions to discharge the gas through the associated opening.

HERMAN BLEIBTREU.
JOHN B. EBERLEIN.